United States Patent [19]

Forbord

[11] Patent Number: 5,442,505
[45] Date of Patent: Aug. 15, 1995

[54] BLOCK ASSEMBLY FOR A DISK DRIVE WITH AUGMENTING MAGNETS

[75] Inventor: Kent J. Forbord, St. Louis Park, Minn.

[73] Assignee: Seagate Technology, Inc., Scotts Valley, Calif.

[21] Appl. No.: 288,156

[22] Filed: Aug. 9, 1994

Related U.S. Application Data

[63] Continuation of Ser. No. 24,611, Mar. 1, 1993, abandoned.

[51] Int. Cl.6 .......................... G11B 5/55; G11B 21/08
[52] U.S. Cl. .................................................. 360/106
[58] Field of Search ........................................ 360/106

[56] References Cited

U.S. PATENT DOCUMENTS

4,620,253 10/1986 Garwin et al. ...................... 360/106
4,945,330 7/1990 Arita .................................... 335/229

Primary Examiner—Robert S. Tupper
Attorney, Agent, or Firm—Kinney & Lange

[57] ABSTRACT

A magnetic pole piece assembly is provided for a disk drive system creating and distributing a permanent magnetic field that interacts with a transient magnetic field produced by an actuator coil in a disk drive system. The magnetic pole piece assembly includes permanent magnets, booster magnets and a block comprised of a front leg separated from a back leg by a gap space. The gap space provides a means for conducting magnetic flux between the front leg and the back leg.

14 Claims, 5 Drawing Sheets

BLOCK ASSEMBLY FOR A DISK DRIVE WITH AUGMENTING MAGNETS

This is a continuation of application Ser. No. 08/264,611, filed Mar. 1, 1993, now abandoned.

BACKGROUND OF THE INVENTION

The present invention relates to track accessing arm movement in disc drive systems. More specifically, the present invention relates to a magnetic pole piece assembly that creates and distributes a permanent magnetic field which interacts with a transient magnetic field produced by an actuator coil. The interaction of the two magnetic fields causes the actuator coil to move in a path proximate to the magnetic pole piece. The actuator coil is connected to a first end of an E-block assembly. The E-block assembly includes a plurality of track accessing arms at a second end. A transducer head assembly is typically connected to a resilient member, such as a gimbal spring, which in turn, is connected to the second end of the E-block assembly. The transducer head assembly is used to write and retrieve data from concentric tracks on magnetic media discs.

The disc drive system selectively applies current to the actuator coil which causes a transient magnetic field to emanate from the coil. Applying varied amounts of current to the actuator coil allows the disc drive system to position and hold the transducer head assembly over selected concentric tracks on the magnetic media disc. The transient magnetic field produced by the actuator coil interacts with the permanent magnetic field contained within the magnetic pole piece. The interaction between the transient and permanent magnetic fields creates a force which moves the actuator coil and thereby moves the E-block assembly with its plurality of track accessing arms over the tracks on the magnetic media disc.

In a rotary actuator assembly, the interaction between the permanent and transient magnetic fields creates a torque which rotates the E-block assembly around an axis of rotation. The rotation of the E-block assembly moves track accessing arms and positions the transducer head assemblies over selected concentric tracks on the magnetic media discs.

In a typical short seek operation, a disc drive system accelerates the actuator with full current applied to the actuator coil until it decelerates according to a velocity profile as dictated by the servo control system. In longer seeks, the actuator accelerates with full current applied to the actuator coil until it reaches the maximum speed allowed by the servo system. It maintains this speed until it decelerates according to the velocity profile similar to a shorter seek. The velocity or deceleration profiles are stored in the memory of a microprocessor in the disc drive system and define the velocity of the transducer head as it moves across tracks during a seek mode. The deceleration profile controls the current needed to achieve the design velocity. Hence, during a track seek operation, the microprocessor will drive the actuator coil with a current dictated by the velocity demand profile, typically accelerating the transducer head to a maximum seek velocity, and then decelerating the head to hopefully bring it to a halt over the desired destination track.

In setting the varying levels of current as dictated by the velocity profiles, the strength of the permanent magnetic field contained within the magnetic pole piece must be determined. The magnetic flux density produced by the permanent magnets along an actuator coil path is a factor in determining the amount of current that should be applied to the actuator coil. At locations along the actuator coil path at which the permanent magnetic field is weak, greater current must be applied to create a stronger transient magnetic field to ensure that there is enough magnetic force to move the actuator according to the velocity profile.

A disadvantage of prior art magnetic block assemblies is that it is common for the strength of the permanent magnetic field to taper off near the ends of the permanent magnet. This causes the weakest concentration of flux density to be near the ends of the permanent magnets, which also corresponds to the ends of the actuator path. In order to have enough current overhead when following the deceleration profile at all locations along the actuator path, the deceleration profile must be set according to the weakest magnetic flux density along the actuator coil path which is typically at the ends of the actuator path.

SUMMARY OF THE INVENTION

The present invention provides a magnetic pole piece assembly for use in a disc drive system which enhances the magnetic flux density contained within the pole piece near the extremes of the permanent magnets. Therefore, the velocity demand profile of the disc drive system can operate assuming higher magnetic flux density levels than obtainable by the prior art.

The magnetic pole piece creates, distributes and contains a permanent magnetic field which interacts with a transient magnetic field produced by an actuator coil. The interaction between the permanent and transient magnetic fields moves the actuator and thereby moves the E-block assembly. Movement of the E-block positions and holds a transducer head assembly over selected concentric tracks of a magnetic media disc. The magnetic pole piece includes main magnets and augmenting booster magnets placed proximate to the end of each main magnet to enhance the concentration of magnetic flux density near the extremes of the main magnets.

The augmenting booster magnets emanate additional magnetic flux density near the extremes of the main magnets without increasing the size of the magnetic pole piece. Use of the present invention allows for a more aggressive deceleration profile which stops the actuator in a shorter amount of time. The present invention also allows for more aggressive acceleration when full current is applied to the actuator coil before the current is controlled as dictated by the velocity profile. More aggressive acceleration and deceleration profiles yield faster access times. In the alternative, the improved flux density at the ends of the actuator path can result in lower power consumption if decreasing seek times is not a priority.

The servo system used in conjunction with the present invention assumes a predetermined flux density profile across the actuator coil path which may or may not be uniform. In less sophisticated servo systems, a uniform flux density across the actuator coil path is assumed. In the latter case, the additional magnetic flux density near the ends of the actuator path as provided by the present invention flattens or reduces the variability of the torque constant profile which is directly related to the flux density profile and reduces the amount of undershoot and overshoot of the servo system. Overshoot is a result of the flux density being less than what is assumed. This causes the actuator to travel beyond the track before settling in. Undershoot is a result of the flux density being greater than what is assumed which causes the actuator to slow down too early. Both overshoot and undershoot are undesirable since they degrade the ability of the servo system and undershoot degrade access times, or in severe cases, settle in on the desired track. Ultimately, cause seek errors.

DETAILED DESCRIPTION OF THE PREFERRED EMBODIMENTS

Figure 1:
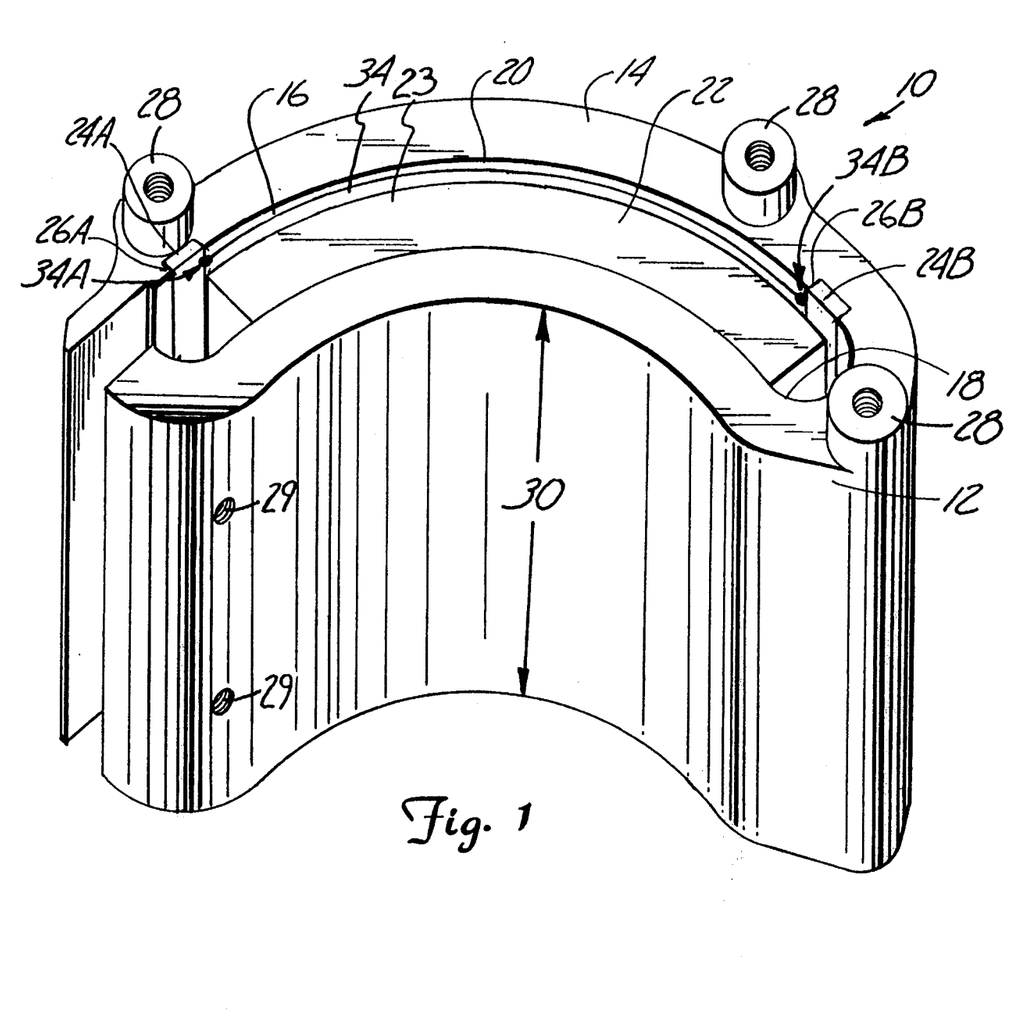
FIG. 1 is a perspective view of a rotary actuator magnetic pole piece made in accordance with the present invention.

FIG. 1 is a perspective view of magnetic pole piece 10 made in accordance with the present invention. Magnetic pole piece 10 is used with a rotary actuator assembly (not shown). Magnetic pole piece 10 includes front leg 12, back leg 14, gap space 16, front gap surface 18, back gap surface 20, main magnets 22 and 23, augmenting booster magnets 24A and 24B, grooves 26A and 26B and screw receiving holes 28 and 29. Also shown is surface width 30 and actuator path 34 with first end 34A and second end 34B.

In this embodiment, magnetic pole piece 10 shows front leg 12 with main magnets 22 and 23 positioned on front gap surface 18. Main magnets 22 and 23 have a length which extends surface width 30. Main magnets 22 have a thickness which extends into, but does not completely occupy, gap space 16 and a width from first end 34A to second end 34B. Booster magnets 24A and 24B are embedded within grooves 26A and 26B, respectively. Grooves 26A and 26B, in turn, are defined in back surface 20 of back leg 14. Screw receiving holes 28 are formed into back leg 14 to accept screws for securing magnetic pole piece to the deck of the disc drive assembly. Screw receiving holes 29 are formed into front leg 12 to accept screws for securing an end cap (not shown) to magnetic pole piece 10.

Gap space 16 separates front gap surface 18 from back gap surface 20 and provides a means for flux to be conducted within magnetic pole piece 10. Main magnets 22 and 23 create a permanent magnetic field which is distributed within gap space 16.

During assembly, an actuator coil (not shown) rotates into gap space 16. An end cap (not shown) then fits into the gap between front leg 12 and back leg 14 to close the magnetic circuit. When energized by the disc drive system, the actuator coil emanates a transient magnetic field which interacts with a permanent magnetic field created by main magnets 22 and 23. Operable actuator path 34 defines an area in which both permanent and transient magnetic fields interact. A leading edge of an actuator coil (not shown) moves through gap space 16 along actuator path 34 which extends from first end 34A to second end 34B. Booster magnets 24A and 24B are positioned proximate to actuator path first end 34A and actuator path second end 34B, respectively. Positioning of booster magnets 24A and 24B proximate to actuator path first end 34A and actuator path second end 34B, respectively, allows for the creation of magnetic flux near the ends of main magnets 22 and 23. Prior art magnetic pole pieces create a permanent magnetic field by using two permanent magnets (such as main magnets 22 and 23). The addition of augmenting booster magnets 24A and 24B, however, increases magnetic flux density near each end of actuator path 34. Increased magnetic flux density throughout gap space 16 translates into faster track seek times because there is less diminishing magnetic flux density at the ends of main magnet 22. In the alternative, the addition of augmenting booster magnets 24A and 24B can result in lower current and power consumption if increasing seek times is not a priority.

In an alternative embodiment, booster magnets 24A and 24B could be positioned in grooves 26A and 26B, respectively, on front gap surface 18 while main magnets 22 and 23 could be positioned on back gap surface 20. However, booster magnets 24A and 24B must always be positioned proximate to actuator path first end 34A and 34B, respectively.

Figure 2:
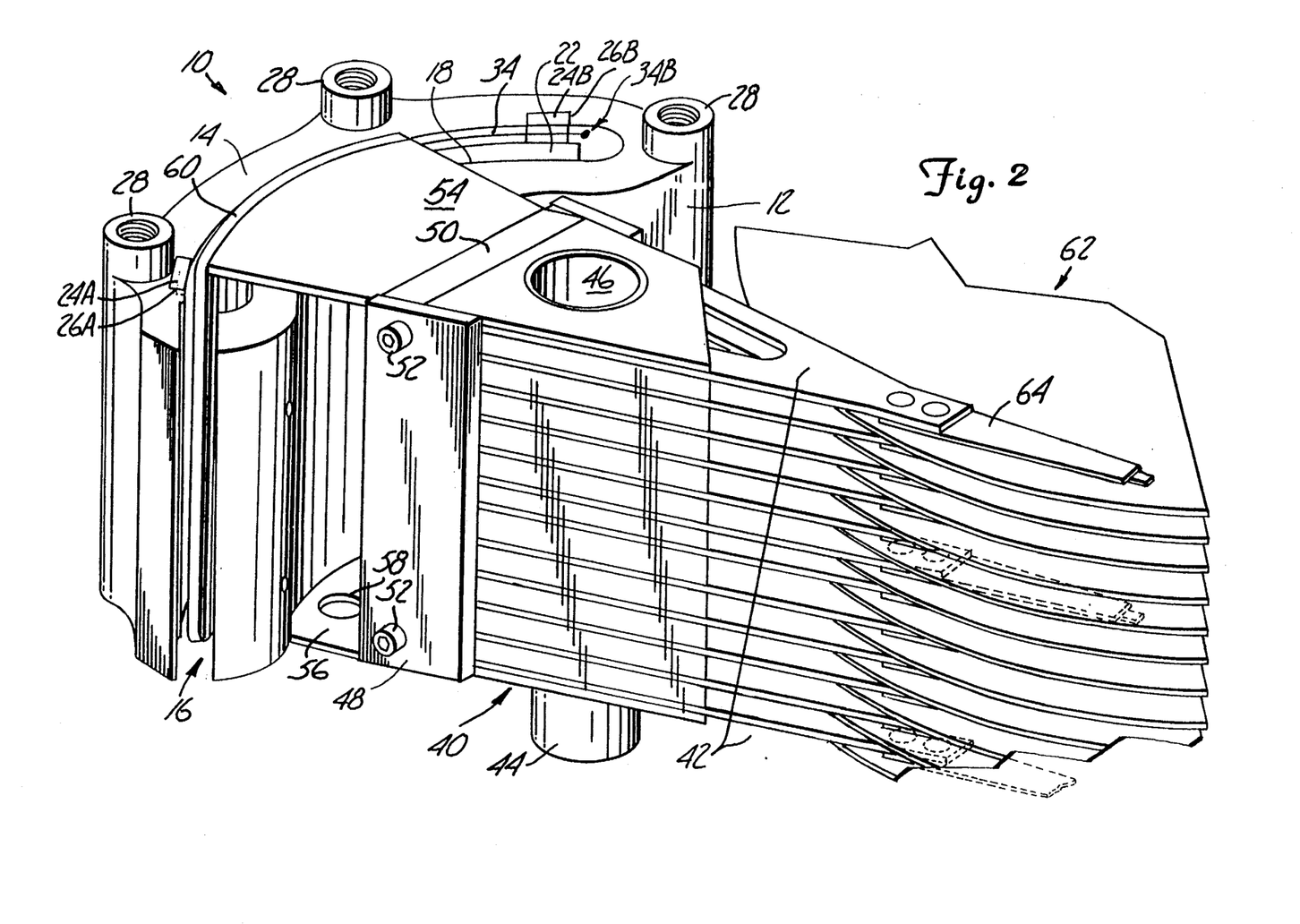
FIG. 2 is a perspective view of the magnetic pole piece shown in FIG. 1 as employed with a rotary actuator assembly.

FIG. 2 is a perspective view of E-block assembly 40 used in conjunction with magnetic pole piece 10 of in FIG. 1. E-block assembly 40 includes a plurality of track accessing arms 42, actuator spindle 44, actuator spindle aperture 46, support plates 48, support plate 50, fasteners 52, upper actuator support flange 54, lower actuator support flange 56, mass reducing aperture 58 and actuator coil 60. Also shown are magnetic media disc 62 and transducer head assembly 64.

Actuator spindle 44 fits in actuator spindle aperture 46 to form an axis of rotation between actuator coil 60 and track accessing arms 42. Track accessing arms 42 have a first end coupled to transducer head assembly 64 and a second end proximate to support plates 48 and 50. Transducer head assembly 64 reads and writes data from magnetic media disc 62.

Actuator coil 60 moves within gap space 16 of magnetic pole piece 10. Actuator coil 60 is supported by upper actuator flange 54 which extends from a side of actuator spindle 44 distal from transducer head assembly 64 to contact a side of actuator coil 60. Lower actuator flange has a mass reducing aperture 58 and also extends from a side of actuator spindle 44 distal from transducer head assembly 64, to contact a second side of actuator coil 60 (not shown).

During a track seek operation, actuator coil 60 moves back and forth through gap space 16 along actuator path 34. Actuator path begins at first end 34A (not shown) and extends to second end 34B.

The transient magnetic field produced by actuator coil 60 interacts with the permanent magnetic field produced by main magnets 22 and 23 and augmenting booster magnets 24A and 24B of magnetic pole piece 10. Both permanent and transient magnetic fields are contained by front leg 12, back leg 14 and an end cap (not shown) of magnetic pole piece 10. The addition of augmenting booster magnets 24A and 24B creates extra magnetic flux proximate to first end 34A (not shown) and second end 34B, respectively. The extra magnetic flux created near first end 34A and second end 34B of actuator path 34 allows actuator coil 60 to move through gap space 16 with greater force than a magnetic pole piece without augmenting booster magnets 24A and 24B. As actuator coil 60 moves through gap space 16, track accessing arms 42 rotate about an axis formed by actuator spindle 44. Excitation of actuator coil 60 by the disc drive system, therefore, moves transducer head assembly 64, which extends from track accessing arms 42, to read selected tracks on magnetic media disc 62.

Figure 3:
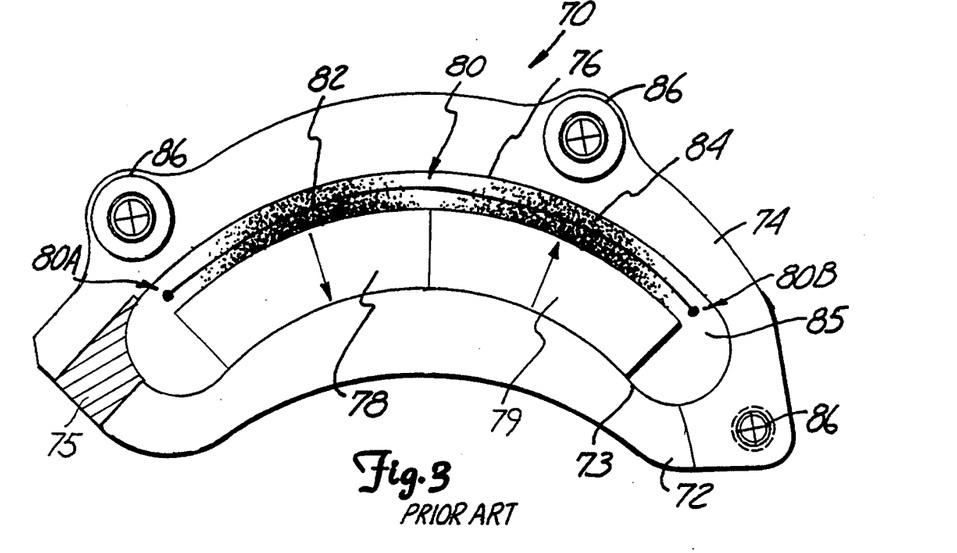
FIG. 3 is a top view of a magnetic pole piece without augmenting booster magnets which shows magnetic flux density as it is distributed within the magnetic pole piece.

FIG. 3 shows a top view of magnetic pole piece 70 without augmenting booster magnets. Magnetic pole piece 70 includes front leg 72, front gap surface 73, back leg 74, end cap 75, back gap surface 76, main magnets 78 and 79, actuator path 80, actuator path first end 80A, actuator path second end 80B, first magnetic flux concentration 82, second magnetic flux concentration 84, gap space 85 and fasteners 86.

In the embodiment shown, magnetic pole piece 70 has main magnets 78 and 79 positioned on front gap surface 73 of front leg 72. No augmenting booster magnets are shown positioned on back leg 74 or embedded within back gap surface 76. Main magnets 78 and 79 create and distribute magnetic flux through gap space 85. Front leg 72, back leg 74 and end cap 75 contain magnetic flux within magnetic pole piece 70. Arrows on magnets 78 and 79 indicate charging direction and the resulting field direction. The distribution pattern of a magnetic flux density is shown as first magnetic flux concentration 82 and second magnetic flux concentration 84. An actuator coil (not shown) would move through gap space 85 along actuator path 80. Actuator path 80 extends from actuator path first end 80A to actuator path second end 80B. As shown in the figure, magnetic flux concentration tapers off near first end 80A and second end 80B. A decrease of magnetic flux density near the ends of actuator path 80 causes the actuator coil (not shown) to move more slowly near actuator path first end 80A and actuator path second end 80B. Slower movement of the actuator coil through the gap space 85 implies slower track seek times. Fasteners 86 are shown as a means to secure magnetic pole piece 70 to the disc drive system.

Figure 4:
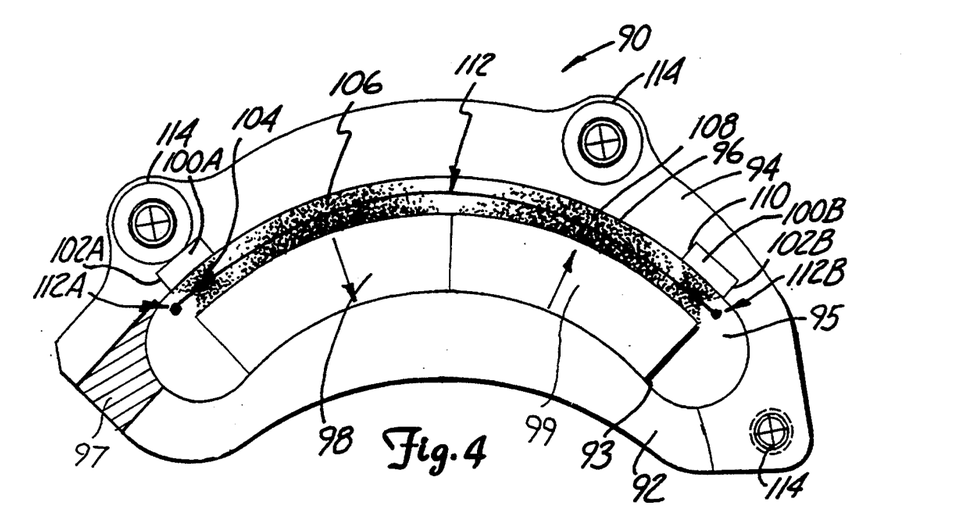
FIG. 4 is a top view of a magnetic pole piece made in accordance with the present invention. Distribution of magnetic flux density within the magnetic pole piece is shown.

FIG. 4 shows a top view of magnetic pole piece 90 with augmenting booster magnets 100A and 100B in place. Magnetic pole piece 90 includes front leg 92, front gap surface 93, back leg 94, back gap surface 96, end cap 97, main magnets 98 and 99, augmenting booster magnets 100A and 100B, grooves 102A and 102B, first magnetic flux concentration 104, second magnetic flux concentration 106, third magnetic flux concentration 108, fourth magnetic flux concentration 110, actuator path 112, actuator path first end 112A, actuator path second end 112B and fasteners 114.

Magnetic pole piece 90 has front leg 92 with front gap surface 93 and back leg 94 with back gap surface 96 separated by gap space 95. Front leg 92, back leg 94 and end cap 97 serve to contain and distribute a permanent magnetic field within gap space 95. Main magnets 98 and 99 are positioned on front gap surface 93 of front leg 92. Augmenting booster magnets 100A and 100B are positioned in grooves 102A and 102B, respectively, on back gap surface 96. Arrows on main magnets 98 and 99 and booster magnets 100A and 100B, indicate charging direction and the resulting field direction. Main magnets 98 and 99 emanate a magnetic flux pattern shown as second magnetic flux concentration 106 and third magnetic flux concentration 108. Augmenting booster magnet 100A emanates a magnetic flux pattern shown as first magnetic flux concentration 104. Augmenting booster magnet 100B emanates a magnetic flux concentration shown as fourth magnetic flux concentration 110. An actuator coil (not shown) travels through gap space 95 along actuator path 112. Actuator path 112 extends from actuator path first end 112A to actuator path second end 112B. The addition of augmenting booster magnets 100A and 100B allows for the creation of first magnetic flux concentration 104 and fourth magnetic flux concentration 110, respectively near the ends of main magnets 98 and 99. Thus, when the actuator coil (not shown) moves through gap 95 along actuator path 112, the tapering of second magnetic flux concentration 106 and third magnetic flux concentration 108 is compensated by first magnetic flux concentration 104 and fourth magnetic flux concentration 110, respectively. The resulting increased flux density near actuator path first end 112A and actuator path second end 112B allow for more aggressive deceleration profiles. Fasteners 114 are shown as a means to secure magnetic pole piece 90 the disc drive system.

Figure 5:
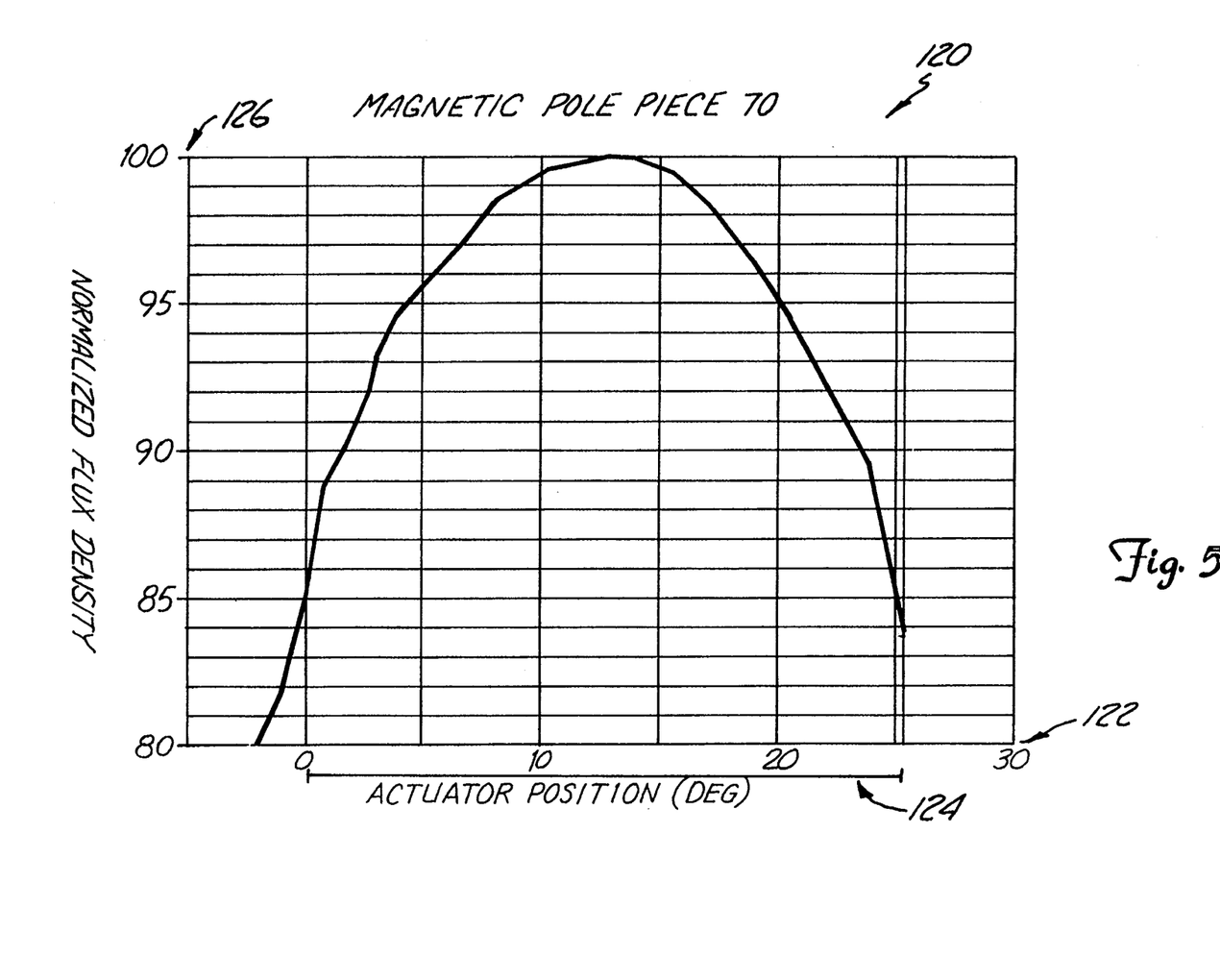
FIG. 5 is a graph of actuator position versus normalized flux density of the magnetic pole piece shown in FIG. 3.

FIG. 5 shows a graph 120 of actuator position versus normalized flux density (or torque constant profile) for magnetic pole piece 70 shown in FIG. 3. X axis 122 shows actuator position along actuator path 80. The actuator is functional only along actuator path 80 which represents areas in which the permanent magnetic field interacts with the transient magnetic field. Line segment 124 which extends from 0 to 25 degrees defines actuator path 80 on graph 120. Y axis 126 shows normalized flux density ranging from 80 to 100 percent. Normalized flux density is the value obtained when the flux density at a given location along actuator path 80 is divided by the maximum flux density contained within gap space 85. At 0 degrees, which represents actuator path first end 80A, the flux density is 85% of the maximum flux density in gap space 85. At approximately 13 degrees, flux density reaches its maximum value, so normalized flux density is 100%. At 25 degrees, which represents second end 80B, flux density drops to 84%. Thus, the magnetic flux density at 80B is 84% of maximum flux density within gap space 85.

Figure 6:
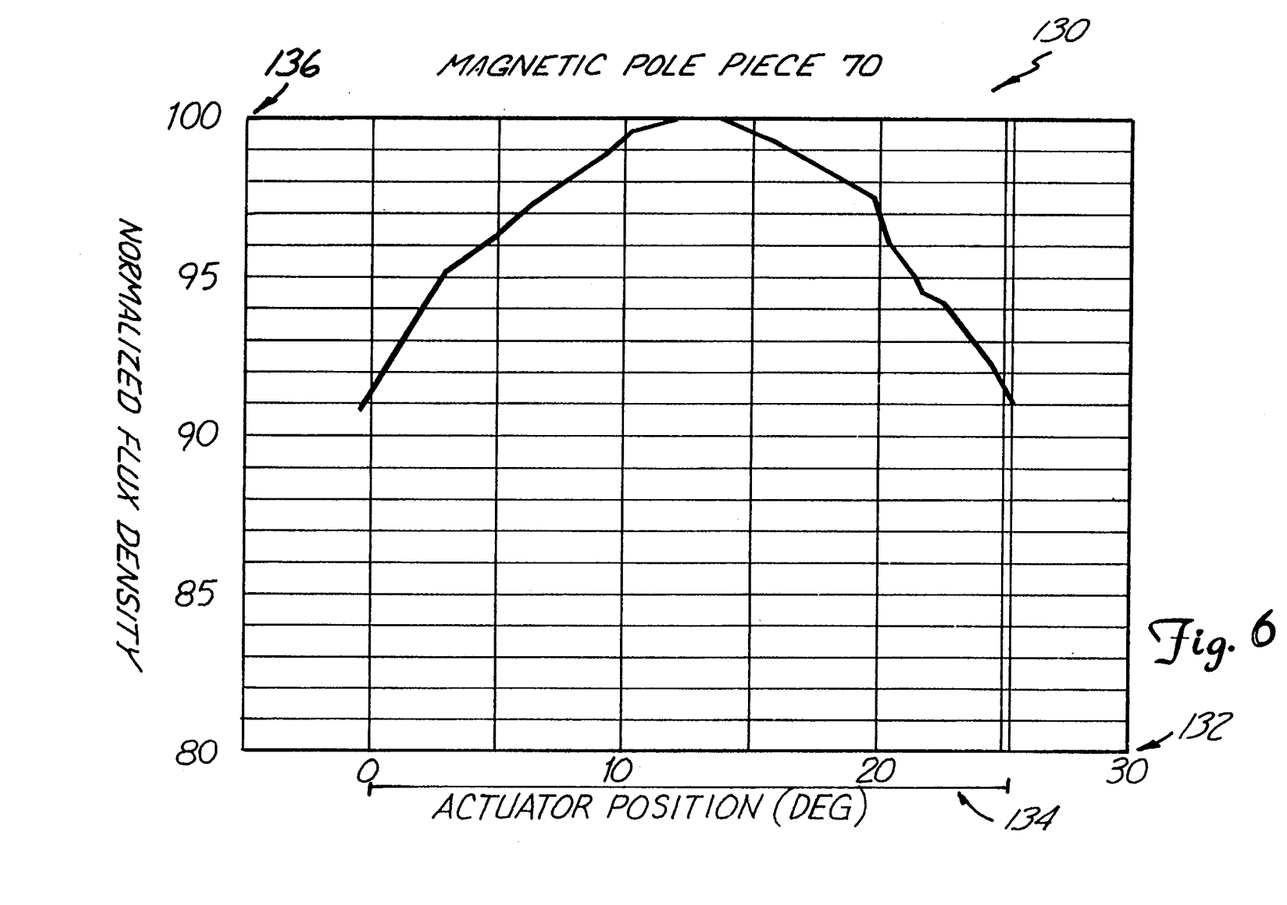
FIG. 6 is a graph of actuator position versus normalized flux density of the magnetic pole piece shown in FIG. 4.

FIG. 6 shows graph 130 of actuator position versus normalized flux density for magnetic pole piece 90 shown in FIG. 4. X axis 132 represents actuator position ranging 0 to 30 degrees. Line segment 134 represents actuator path 112 which is the area within gap space 95 at which the permanent and transient magnetic fields interact. Y axis 136 shows normalized flux density ranging from 80 to 100 percent. At 0 degrees, which represents first end 112A of actuator path 112, flux density is approximately 91% of the maximum flux density within gap space 95. At approximately 13 degrees, flux density reaches its peak, so normalized flux density is 100%. At 25 degrees, which represents second end 112B of actuator path 112, flux density is once again 91% of the peak flux density in gap space 95.

Comparison of the normalized flux densities at 0 degrees of magnetic pole piece 70 (FIG. 3) and magnetic pole piece 90 (FIG. 4), shows a dramatic difference. Specifically, the normalized flux density of magnetic pole piece 90 with augmenting booster magnets 102A and 102B was approximately 6% higher than the normalized flux density of magnetic pole piece 70 which did not use augmenting booster magnets. The difference between magnetic pole piece 70 and magnetic pole piece 90 is also noticeable at 25 degrees. Here, magnetic pole piece 90 of FIG. 4 shows a normalized flux density which is once again 6% higher than magnetic pole piece 70 of FIG. 3. The average magnetic flux density contained within gap space 95 of magnetic pole piece 90 of FIG. 4 was also higher than the average magnetic flux density contained in gap space 85 of magnetic pole piece 70 of FIG. 3. The end result is that an actuator coil moving through gap space 95 of the magnetic pole piece 90 will allow the actuator coil to move according to a more aggressive deceleration profile. Movement according to a more aggressive deceleration profile translates into quicker access times during track seek operations. Movement at greater speeds translates into quicker access times during track seek operations.

In a disc drive system, an actuator coil is driven by a current in order for it to emanate a transient magnetic field proximate to a magnetic pole piece. The magnetic pole piece contains a permanent magnet which emanates a permanent magnetic field. The interaction between the transient and permanent magnetic fields causes the actuator coil to move proximate to the magnetic pole piece. Movement of the actuator coil is transferred to a transducer head assembly via an E-block assembly. It is desirable to maximize the speed at which the actuator coil moves proximate to the magnetic pole piece in order to minimize the time required for the transducer head assembly to reach the desired track location on a magnetic media disc.

A problem associated with prior art magnetic pole pieces is that the permanent magnetic field which is distributed and contained within the magnetic pole piece tends to taper off near each end of the permanent magnet contained within the magnetic pole piece. The tapering off of magnetic flux density near the ends of the permanent magnet results in less aggressive deceleration profiles.

The present invention discloses positioning augmenting booster magnets proximate to the ends of the main magnet contained within the magnetic pole piece. The augmenting booster magnets emanate additional magnetic flux. Positioning of the augmenting booster magnets is near the end of the main magnet (and hence, near the ends of the actuator coil path), allows the actuator coil to move proximate to the magnetic pole piece with more force and speed than prior art magnetic pole pieces. The advantages attained with the present invention include faster track seek times or, in the alternative, a decrease in the current needed to drive the actuator coil if maximizing track seek time is not a priority.

Although the present invention has been described with reference to preferred embodiments, workers skilled in the art will recognize that changes may be made in form and detail without departing from the spirit and scope of the invention.

What is claimed is:

1. A disk drive system for writing data to and retrieving data from tracks of a magnetic media disk, the disk drive system comprising:
   a transducer for recording and retrieving the data;
   an actuator coil;
   an E-block assembly coupled generally between the transducer and the actuator coil, the E-block assembly comprising:
      a plurality of track accessing arms each with a first end and a second end, the second end being coupled to the transducer;
      an elongated central portion disposed generally between the actuator coil and the plurality of track accessing arms, which defines an axis of rotation between the actuator coil and the track accessing arms wherein the first ends of the track accessing arms extend from a side of the central portion distal from the actuator coil; and
   a magnetic pole piece comprising:
      a front leg having a first gap surface;
      a back leg having a second gap surface wherein a gap space separates the first gap surface from the second gap surface, and wherein the gap space defines an actuator path having a first end and a second end for movement of the actuator coil;
      permanent magnet means positioned on one of the first and second gap surfaces of the magnetic pole piece; and
      a plurality of additional augmenting magnets positioned on one of the first and second gap surfaces, the additional magnets being located on an opposite gap surface from the permanent magnet means, and positioned proximate to the first and second ends of the actuator path to increase flux density across the gap space at the first and second ends of the actuator path.

2. The disk drive system of claim 1 wherein the gap surfaces each have a surface width.

3. The disk drive system of claim 2 wherein the length of the permanent magnet means is transverse to the surface width and extends substantially the entire surface width of the gap surface on which it is positioned.

4. The disk drive system of claim 2 wherein the length of the augmenting magnets is transverse to the surface width and extends substantially the entire surface width of the gap surface on which it is positioned.

5. The disk drive system of claim 3 wherein the permanent magnet means is positioned on the first gap surface.

6. The disk drive system of claim 3 wherein the permanent magnet means is positioned on the second gap surface.

7. The disk drive system of claim 4 wherein the augmenting magnets are positioned on the first gap surface.

8. The disk drive system of claim 4 wherein the augmenting magnets are positioned on the second gap surface.

9. The disk drive system of claim 1 wherein one augmenting magnet is positioned at the first end of the actuator path and the other augmenting magnet is positioned at the second end of the actuator path.

10. The disk drive system of claim 1 wherein grooves are carved out of the gap surface in which the augmenting magnets are positioned.

11. A disk drive system comprising:
    a transducer for recording and retrieving data;
    an actuator coil;
    an E-block assembly comprising:
       a plurality of track accessing arms each with a first, second end, the second end being coupled to the transducer;
       an elongated central portion defining an axis of rotation, an actuator path formed in the elongated central portion, the actuator coil being mounted in the actuator path to travel along the actuator path as the E-block rotates on the axis of rotation, the first ends of the plurality of track accessing arms being connected to the elongated central portion; and a magnetic pole piece comprising:
- a first and a second gap surface, the first and second gap surfaces forming opposite surfaces of the actuator path;
- at least one permanent magnet positioned on the first gap surface; and
- at least one additional augmenting magnet positioned on the second gap surface proximate an end of the actuator path to increase flux density at the end of the actuator path.

12. The disc drive system of claim 11 wherein the magnetic pole piece further comprises a front leg and a back leg forming the first and second gap surface separated by a gap space defining the actuator path, the at least one permanent magnet includes first and second permanent magnets arranged to provide magnetic fields in opposite directions across the gap space at different locations along the actuator path.

13. The disc drive system of claim 12 wherein the actuator path has a first end and a second end, and wherein the at least one additional augmenting magnet comprises a first augmenting magnet positioned proximate to the first end of the actuator path to increase flux density across the gap at the first end of the actuator path and a second augmenting magnet positioned proximate to the second end of the actuator path to increase flux density across the gap at the second end of the actuator path.

14. The disc drive system of claim 11 wherein the actuator path has a first end and a second end, and wherein the at least one additional augmenting magnet comprises a first augmenting magnet positioned proximate to the first end of the actuator path to increase flux density across the gap at the first end of the actuator path and a second augmenting magnet positioned proximate to the second end of the actuator path to increase flux density across the gap at the second end of the actuator path.

* * * * *

UNITED STATES PATENT AND TRADEMARK OFFICE
CERTIFICATE OF CORRECTION

PATENT NO. : 5,442,505
DATED : August 15, 1995
INVENTOR(S) : KENT J. FORBORD

It is certified that error appears in the above-indentified patent and that said Letters Patent is hereby corrected as shown below:

Col. 3, lines 7-9, after "system", delete "and undershoot degrade access times, or in severe cases, settle in on the desired track. Ultimately, cause seek error's", and insert --to settle in on the desired track. Ultimately, overshoot and undershoot degrade access times, or in severe cases cause seek errors."

Signed and Sealed this

Twenty-fourth Day of October, 1995

Attest:

BRUCE LEHMAN

*Attesting Officer*   *Commissioner of Patents and Trademarks*